S. W. BROWNE.
BELT SHIFTER.
APPLICATION FILED APR. 13, 1911.
1,020,021.
Patented Mar. 12, 1912.
3 SHEETS—SHEET 1.
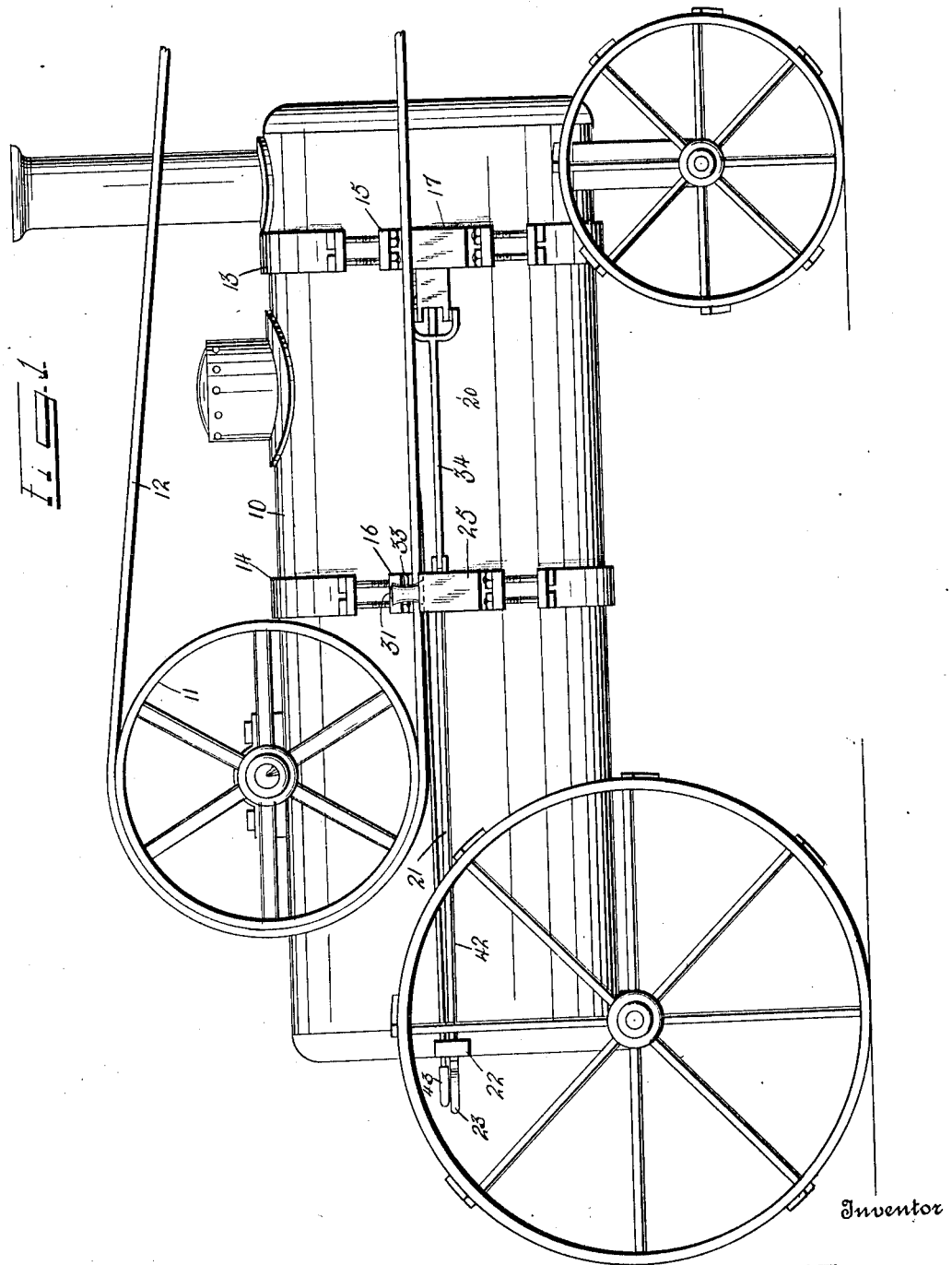
Witnesses
J. C. Shickel
Henry T. Bright
Inventor
Stephen W. Browne.
By
Attorneys S. W. BROWNE.
BELT SHIFTER.
APPLICATION FILED APR. 13, 1911.
1,020,021.
Patented Mar. 12, 1912.
3 SHEETS—SHEET 2.
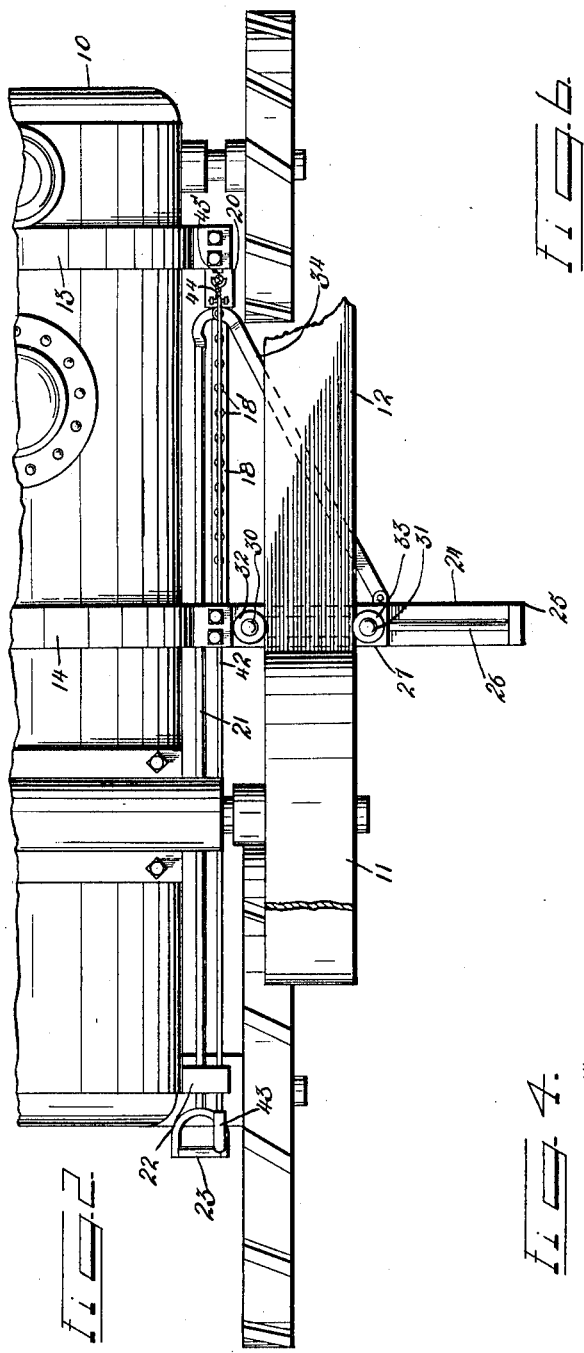
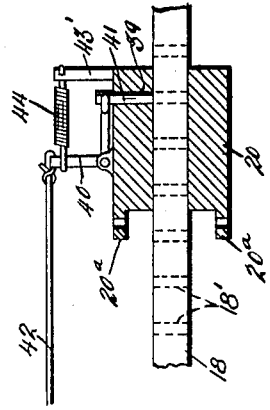
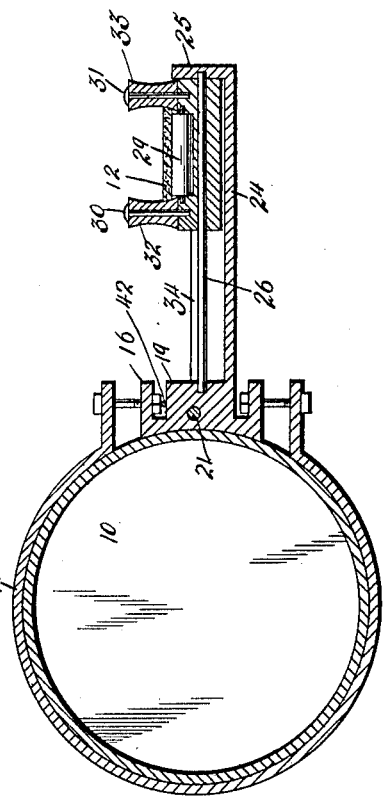
Inventor
STEPHEN W. BROWNE.
Witnesses
J. E. Strohl
Henry T. Bright
By Chandler & Chandler
Attorneys.
COLUMBIA PLANOGRAPH CO., WASHINGTON, D. C.

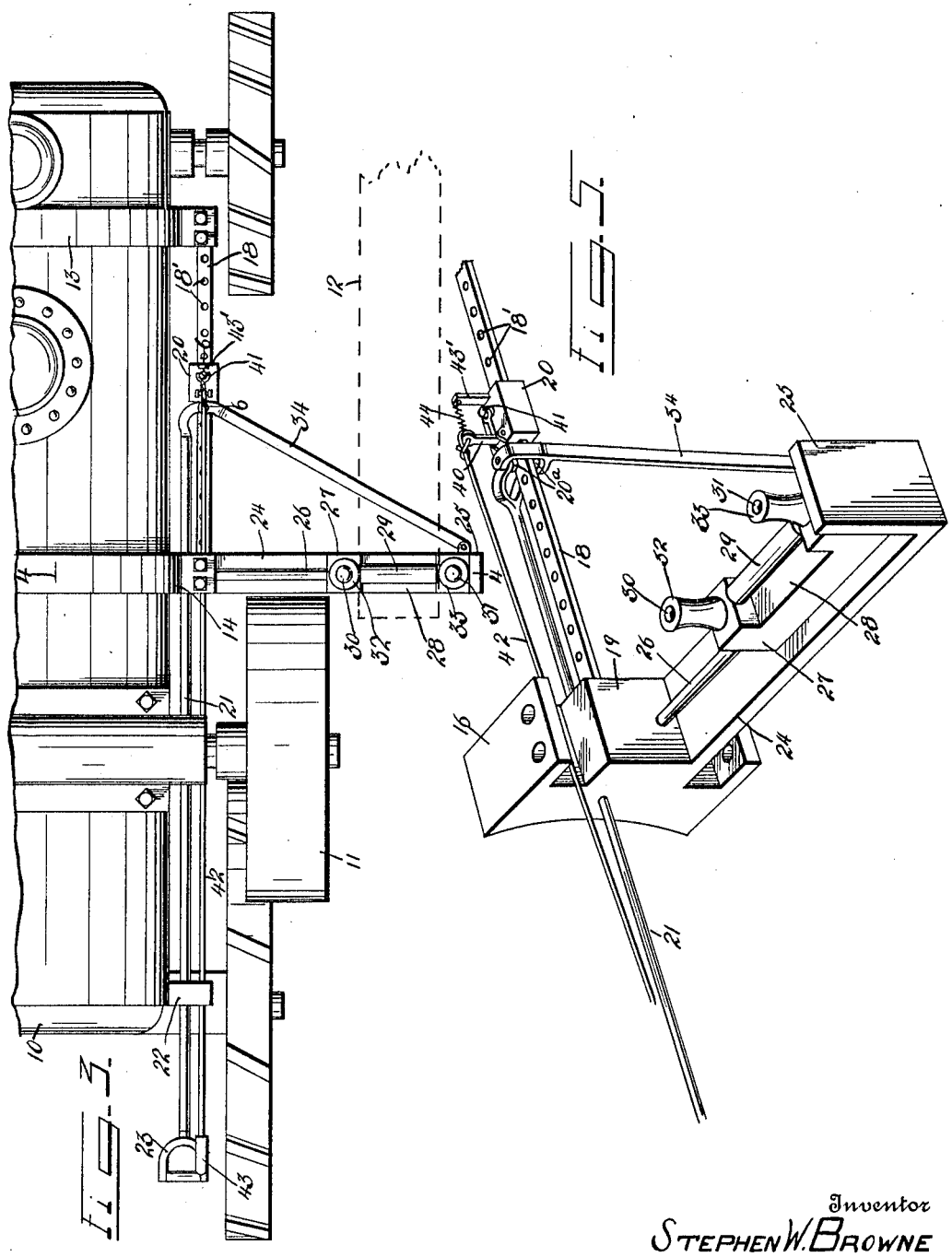

UNITED STATES PATENT OFFICE.

STEPHEN W. BROWNE, OF WILSONVILLE, NEBRASKA.

BELT-SHIFTER.

1,020,021. Specification of Letters Patent. Patented Mar. 12, 1912.

Application filed April 13, 1911. Serial No. 620,822.

*To all whom it may concern:*

Be it known that I, STEPHEN W. BROWNE, a citizen of the United States, residing at Wilsonville, in the county of Furnas, State of Nebraska, have invented certain new and useful Improvements in Belt-Shifters; and I do hereby declare the following to be a full, clear, and exact description of the invention, such as will enable others skilled in the art to which it appertains to make and use the same.

This invention relates to belt shifters.

The object of the invention resides in the provision of a belt shifting attachment especially adapted for use upon traction engines and other motors where a belt wheel is employed and when it becomes desirable and important to disengage the engine from the drive belt while the latter is being rapidly driven.

A further object of the invention resides in the provision of a belt shifting attachment which may be easily associated with a traction engine and which may be relied upon to promptly disengage the belting from the driving wheel of the engine while the latter is in operation and during the actuation of the threshing machine or other mechanism which is being driven by the engine.

With the above and other objects in view the invention consists in the details of construction and in the arrangement and combination of parts to be hereinafter more fully described and particularly pointed out in the appended claim.

In describing the invention in detail, reference will be had to the accompanying drawings, wherein like characters of reference denote corresponding parts in the several views, and in which—

Figure 1 is a side elevation of a traction engine showing the invention associated therewith. Fig. 2 a top plan view in part of Fig. 1, Fig. 3 a view similar to Fig. 2 with the parts of the belt shifting device shown in the position they would occupy when same has been operated to shift the belt from the driving wheel. Fig. 4 a section on the line 4—4 of Fig. 3. Fig. 5 a detail perspective view of a portion of the belt shifter, and Fig. 6 a section on the line 6—6 of Fig. 3.

Referring to the drawings 10 indicates the boiler of a locomotive or traction engine of the usual or any preferred construction, while 11 indicates the drive wheel around which is disposed a belt 12, all of the usual or any desired construction. This belt 12 is adapted to be placed in operative relation with the wheel on the cylinder of the threshing machine or other mechanism to be driven by the engine.

Surrounding the boiler 10 at a suitable location thereon is a band 13, while another band 14 surrounds said boiler between the driving wheel 11 and the band 13. The band 13 has its terminals so constructed as to be easily secured to opposite ends of a casting 15, said casting when so engaged by the terminals of the band 13 constituting the continuation of said band. Likewise the terminals of the band 14 are constructed so as to be easily attached to opposite ends of a casting 16, and said casting constitutes a continuation of the band 14 when so associated therewith. The casting 15 is provided with a lateral enlargement 17 and to this enlargement is secured in any suitable manner one end of a bar 18, said bar being provided with a series of openings 18' for a purpose that will presently appear. The casting 16 is also provided with a lateral enlargement 19 to which is secured the other end of the bar 18. Slidably mounted on the bar 18 is a sleeve 20 having its end adjacent the casting 16 provided with spaced ears 20ª disposed on opposite sides of the bar 18 respectively. Pivotally connected to the ears 20ª is the forked end of an operating rod 21. This rod 21 extends through the enlargement 19 of the casting 16 and through a bracket 22 on the rear end of the boiler 10 and terminates in a hand hold 23. By this construction it will be apparent that when the hand hold 23 is gripped and the rod 21 is reciprocated the sleeve 20 will be likewise reciprocated on the bar 18.

The enlargement 19 of the casting 16 is provided at its lower end with a lateral extension 24 which terminates in an upwardly extending portion 25 disposed in parallel spaced relation to the outer face of the enlargement 19. Connecting the enlargement 19 and the upwardly extending portion 25 is a rod 26 upon which is slidably mounted a block 27. This block is provided in its upper face with a central cutaway portion 28 and journaled between the end walls of this cutaway portion 28 is a roller 29. Rising from the upper face of the block 27 at the inner end thereof is a pin 30 while a corresponding pin 31 rises from the upper face of the block at the outer end thereof and rotatably mounted on these pins 30 and 31 are rollers 32 and 33 respectively.

In order to reciprocate the block 27 upon the rod 26, said block is connected to the sleeve 20 by means of a link 34, one end of which is pivotally connected to said block, while the other end thereof is forked and pivotally connected to the ears 20ª of the sleeve 20. By this construction it will be apparent that as the operating rod 21 is reciprocated in one direction the block 27 will be moved through the instrumentality of the link 34 to the outer end of the rod 26, while the reverse movement of said operating rod will shift the block 27 to the inner end of the rod 26. In this connection it will be understood that when the block 27 is positioned at the inner end of the rod 26 it is in alinement with the driving wheel 11, and the belt 12 will then pass between the rollers 32 and 33 and be held thereby against lateral movement and consequent displacement from the driving wheel. However, when the block 27 is shifted to the outer end of the rod 26 through the agency of the instrumentalities previously described it will engage the belt 12 and force same outwardly until said belt is entirely shifted from the driving wheel.

In order to lock the sliding block 27 against movement when it has been positioned so as to positively secure the belt upon the driving wheel the following structure is resorted to. An opening 39 is formed in the sleeve 20 and affords communication between the upper face of said sleeve and the passage through which the bar 18 extends. Pivotally mounted upon the upper face of the sleeve 20 is an angle lever 40 one arm of which is secured to a locking pin 41 movable in the opening 39, while the other arm of said lever is attached to one end of a connection 42 which extends through the bracket 22 and terminates in a hand hold 43. Extending upwardly from the sleeve 20 is a finger 43' which has secured thereto one end of a spring 44 while the other end of this spring is secured to the arm of the angle lever 40 which is attached to the connection 42. This spring constantly tends to operate the angle lever 40 so as to move the locking pin into one of the openings 18'. By this construction it will be apparent that when one of the openings 18' registers with the opening 39 the locking pin 41 will be forced by the spring 44 into the registering opening 18' thereby locking the operating rod 21 and consequently the rest of the mechanism of the device against movement. It will also be observed that by operating the connection 42 to move the angle lever 40 against the influence of the spring 44 the locking pin 41 can be disengaged from the bar 18 and thereby permit the free operation of the device as required.

What is claimed is:

A belt shifter comprising a bracket, a shifting member slidably mounted on said bracket, a rod fixed on the bracket and provided with a plurality of openings, a sleeve slidable on said rod, a second rod slidably mounted in the bracket and secured to said sleeve whereby the sliding of said second named rod in the bracket will slide said sleeve on the first named rod, a spring actuated locking pin carried by said sleeve and adapted to engage in the openings in the first named rod to lock the sleeve and second named rod against sliding movement, and connections between the sleeve and the shifting member whereby the movement of the former will slide the latter.

In testimony whereof, I affix my signature, in presence of two witnesses.

STEPHEN W. BROWNE.

Witnesses:
CHARLES A. BURT,
FRED. J. BROWNE.